US012634809B2

(12) United States Patent
Kim et al.

(10) Patent No.: US 12,634,809 B2
(45) Date of Patent: May 19, 2026

(54) METHOD FOR PROVIDING NETWORK FUNCTION FOR ROAMING USER EQUIPMENT

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 522 days.

(21) Appl. No.: 18/190,417

(22) Filed: Mar. 27, 2023

(65) Prior Publication Data

US 2023/0308998 A1     Sep. 28, 2023

(30) Foreign Application Priority Data

Mar. 28, 2022     (KR) ........................ 10-2022-0038037

(51) Int. Cl.
*H04W 48/16*          (2009.01)
*H04W 8/12*           (2009.01)
*H04W 84/04*          (2009.01)

(52) U.S. Cl.
CPC ............. *H04W 48/16* (2013.01); *H04W 8/12* (2013.01); *H04W 84/042* (2013.01)

(58) Field of Classification Search
CPC ...... H04W 48/16; H04W 8/12; H04W 84/042
USPC ....................................................... 370/329
See application file for complete search history.

(56) References Cited

U.S. PATENT DOCUMENTS

| | | | |
|---|---|---|---|
| 2018/0352050 A1 | 12/2018 | Li et al. | |
| 2021/0112478 A1 | 4/2021 | Dannebro et al. | |
| 2022/0053602 A1 | 2/2022 | Kim et al. | |
| 2023/0034349 A1* | 2/2023 | Mladin | ................. H04W 48/08 |
| 2023/0135699 A1* | 5/2023 | Liao | ........................ H04W 4/50 |
| | | | 370/252 |

OTHER PUBLICATIONS

3GPP; 3rd Generation Partnership Project; Technical Specification Group Services and System Aspects; Procedures for the 5G System (5GS); Stage 2 (Release 17); 3GPP TS 23.502; V17.4.0; (Mar. 2022); Mar. 23, 2022; Valbonne, France.

(Continued)

*Primary Examiner* — Chuck Huynh
(74) *Attorney, Agent, or Firm* — Jefferson IP Law, LLP

(57)          ABSTRACT

The disclosure relates to a $5^{th}$ generation (5G) or $6^{th}$ generation (6G) communication system for supporting higher data transmission rates. A method for operating a visited network exposure function (V-NEF) belonging to a visited public land mobile network (VPLMN) of a roaming user equipment (UE) in a wireless communication system is provided. The method includes receiving a first message including identification information about the roaming UE, an application function identifier (AF ID), and an edge computing service provider identifier (ECSP ID), identifying a home network exposure function (H-NEF) belonging to a home public land mobile network (HPLMN) of the roaming UE, and transmitting a second message including a VPLMN ID and the ECSP ID to the H-NEF belonging to the HPLMN.

12 Claims, 7 Drawing Sheets

(56)                     References Cited

OTHER PUBLICATIONS

3GPP; 3rd Generation Partnership Project; Technical Specification
Group Services and System Aspects; System architecture for the 5G
System (5GS); Stage 2 (Release 17); 3GPP TS 23.501; V17.4.0;
(Mar. 2022); Mar. 23, 2022; Valbonne, France.
International Search Report dated Jun. 27, 2023; International
Appln. No. PCT/KR2023/004051.

* cited by examiner

730

830

METHOD FOR PROVIDING NETWORK FUNCTION FOR ROAMING USER EQUIPMENT

CROSS-REFERENCE TO RELATED APPLICATION(S)

This application is based on and claims priority under 35 U.S.C. § 119(a) of a Korean patent application number 10-2022-0038037, filed on Mar. 28, 2022, in the Korean Intellectual Property Office, the disclosure of which is incorporated by reference herein in its entirety.

BACKGROUND

1. Field

The disclosure relates to a wireless communication system. More particularly, the disclosure relates to a method for providing a network function for a roaming user equipment (UE) to a service system (e.g., edge computing system) outside a core network in a mobile communication system.

2. Description of Related Art $5^{th}$ generation (5G) mobile communication technology defines a wide frequency band to enable fast transmission speed and new services and may be implemented in frequencies below 6 gigahertz (GHz) ('sub 6 GHz'), such as 3.5 GHz, as well as in ultra-high frequency bands ('above 6 GHz'), such as 28 GHz and 39 GHz called millimeter wave (mmWave). Further, $6^{th}$ generation (6G) mobile communication technology, which is called a beyond 5G system, is considered to be implemented in terahertz (THz) bands (e.g., 95 GHz to 3 THz) to achieve a transmission speed 50 times faster than 5G mobile communication technology and ultra-low latency reduced by $\frac{1}{10}$.

In the early stage of 5G mobile communication technology, standardization was conducted on beamforming and massive multiple input-multiple output (MIMO) for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 preprocessing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, new radio (NR) user equipment (UE) power saving, nonterrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step random access channel (RACH) for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metabus services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

The above information is presented as background information only to assist with an understanding of the disclosure. No determination has been made, and no assertion is made, as to whether any of the above might be applicable as prior art with regard to the disclosure.

SUMMARY

A user equipment (UE) using a specific application service (e.g., an edge computing service) may intend to use the same service on a visited public land mobile network (PLMN) after roaming. In this case, the application function (AF) which may interwork with the application server providing the service may use a network capability exposure service for a specific UE in the home PLMN (HPLMN).

Specifically, the AF may send a request for, e.g., a guidance for UE routing policy selection policy (URSP) determination and traffic control influence (AF traffic influence) to the network function (e.g., network exposure function (NEF)) in the HPLMN for the AF requirements for the service-related policy for a specific UE.

If the UE roams to the VPLMN in such a context, it is required to allow the policy for the application service, which used to be used in the HPLMN, to be used in the VPLMN as well and, to that end, a method is needed which is capable of transferring AF requirements to the network function in the VPLMN using the network capability exposure service provided by the VPLMN.

Aspects of the disclosure are to address at least the above-mentioned problems and/or disadvantages and to provide at least the advantages described below. Accordingly, an aspect of the disclosure is to provide a method for providing a network function for a roaming user equipment (UE) to a service system (e.g., edge computing system) outside a core network in a mobile communication system.

Additional aspects will be set forth in part in the description which follows and, in part, will be apparent from the description, or may be learned by practice of the presented embodiments.

In accordance with an aspect of the disclosure, a method for operating a visited network exposure function (V-NEF) belonging to a visited public land mobile network (VPLMN) of a roaming user equipment (UE) in a wireless communication system is provided. The method includes receiving a first message including identification information about the roaming UE, an application function identifier (AF ID), and an edge computing service provider identifier (ECSP ID), identifying a home network exposure function (H-NEF) belonging to a home public land mobile network (HPLMN) of the roaming UE, and transmitting a second message including a VPLMN ID and the ECSP ID to the H-NEF belonging to the HPLMN.

In accordance with another aspect of the disclosure, a method for operating a home network exposure function (H-NEF) belonging to a home public land mobile network (HPLMN) of a roaming user equipment (UE) in a wireless communication system is provided. The method includes receiving a first message including a visited public land mobile network (VPLMN) identifier (ID) and an edge computing service provider (ECSP) ID from a visited network exposure function (V-NEF) belonging to the VPLMN of the roaming UE, transmitting a second message including the VPLMN ID and the ECSP ID to a home unified data management (H-UDM) belonging to the HPLMN, and receiving a response message to the second message from the H-UDM.

In accordance with another aspect of the disclosure, a visited network exposure function (V-NEF) device belonging to a visited public land mobile network (VPLMN) of a roaming user equipment (UE) in a wireless communication system is provided. The V-NEF device includes a transceiver and a controller. The controller may be configured to control the transceiver to receive a first message including identification information about the roaming UE, an application function identifier (AF ID), and an edge computing service provider identifier (ECSP ID), identify a home network exposure function (H-NEF) belonging to a home public land mobile network (HPLMN) of the roaming UE, and control the transceiver to transmit a second message including a VPLMN ID and the ECSP ID to the H-NEF belonging to the HPLMN.

In accordance with another aspect of the disclosure, a home network exposure function (H-NEF) device belonging to a home public land mobile network (HPLMN) of a roaming user equipment (UE) in a wireless communication system is provided. The H-NEF device includes a transceiver and a controller. The controller may be configured to control the transceiver to receive a first message including a visited public land mobile network (VPLMN) identifier (ID) and an edge computing service provider (ECSP) ID from a visited network exposure function (V-NEF) belonging to the VPLMN of the roaming UE, control the transceiver to transmit a second message including the VPLMN ID and the ECSP ID to a home unified data management (H-UDM) belonging to the HPLMN, and control the transceiver to receive a response message to the second message from the H-UDM.

According to an embodiment of the disclosure, the method and device may support a network capability exposure service for providing an application service to a roaming UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms referring to network entities and objects of an edge computing system as used herein, the terms referring to messages, and the term referring to identification information are provided as an example for ease of description. Thus, the disclosure is not limited to the terms, and the terms may be replaced with other terms denoting objects with equivalent technical meanings.

Although terms and names as defined in the 5G system standard are used herein for ease of description, embodiments of the disclosure are not limited thereto or thereby, and the same may apply likewise to systems conforming to other standards.

Figure 1:
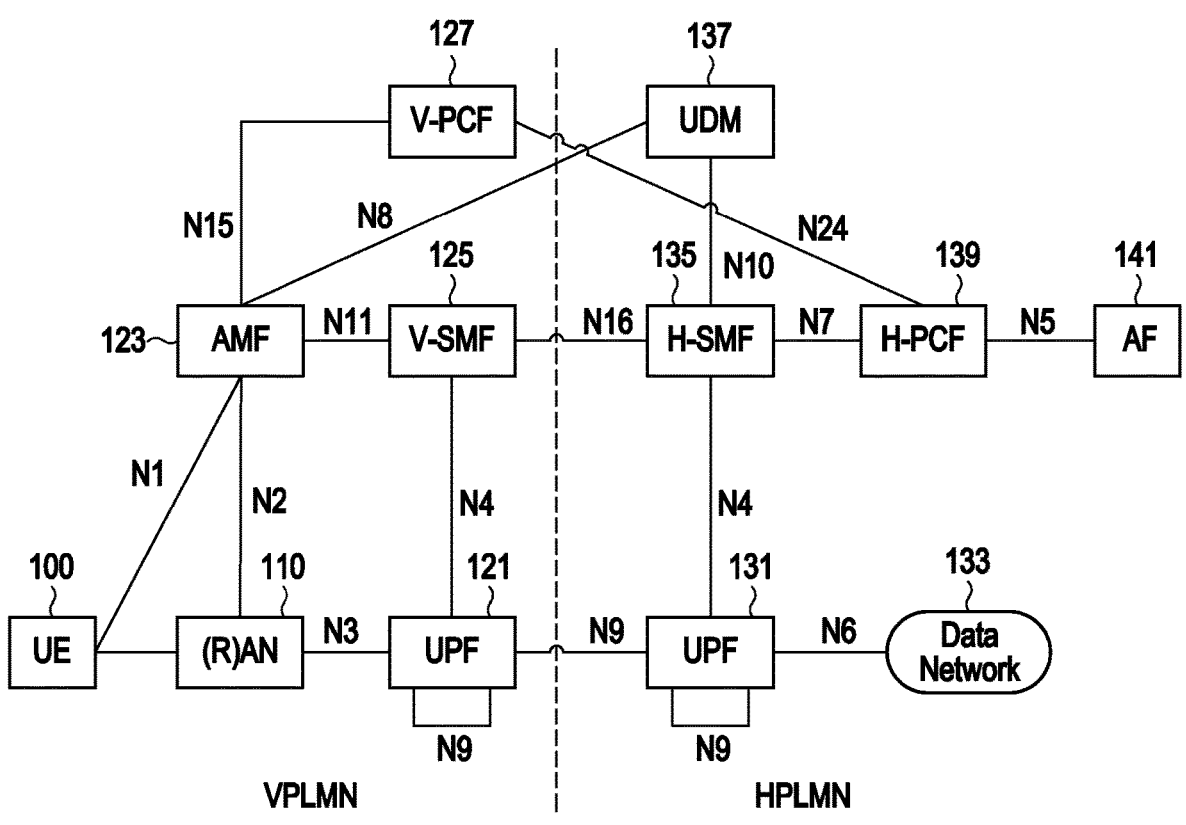
FIG. 1 illustrates a structure of a wireless communication system according to an embodiment of the disclosure.

FIG. 1 illustrates a structure of a wireless communication system according to an embodiment of the disclosure.

A 5G system structure supporting roaming may include various network functions (NF). Referring to FIG. 1, a wireless communication system may include a user equipment (UE) 100, a (radio) access network, ((R)AN) 110, user plane functions (UPFs) 121 and 131, an access and mobility management function (AMF) 123, a session management function (SCF) of a visited public land mobile network (V-SMF) 125, a session management function (SCF) of a home public land mobile network (H-SMF) 135, a policy control function (PCF) of a visited public land mobile network (V-PCF) 127, a policy control function (PCF) of a home public land mobile network (H-PCF) 139, a unified data management (UDM) 137, an application function (AF) 141, and a data network (DN) 133.

In a roaming scenario, the wireless communication system may include a RAN 110, a UPF 121, an AMF 123, a V-SMF 125, and a V-PCF 127 of a visited public land mobile network (VPLMN) and may include a UPF 131, a DN 133, an H-SMF 135, a UDM 137, an H-PCF 139, and an AF 141 of a home public land mobile network (HPLMN).

Each NF supports the following functions.

The AMF 123 provides functions for per-UE access and mobility management and may connect basically to one AMF per UE. V-AMF means an AMF of the VPLMN with respect to the UE subscriber. H-AMF means an AMF of the HPLMN of the UE subscriber.

The DN 133 means, e.g., an operator service, Internet access, or a third party service. The DN 133 transmits downlink protocol data units (PDUs) to the UPFs 121 and 131 and receives the PDUs, transmitted from UE 100, from the UPFs 121 and 131.

The V-PCF 127 and H-PCF 139 receive information about packet flow from application server and provide the function of determining the policy such as mobility management or session management. Specifically, the V-PCF 127 and H-PCF 139 support functions such as support of a signalized policy framework for controlling network operations, providing a policy rule to allow CP function(s) (e.g., AMF or SMF) to execute a policy rule, and implementation of a front end for accessing subscription information related to policy decision in the user data repository (UDR).

The V-SMF 125 and H-SMF 135 provide session management function and, if the UE 100 has multiple sessions, this may be managed per session by a different SMF. V-SMF means an AMF of the VPLMN with respect to the UE subscriber. H-SMF means an SMF of the HPLMN of the UE subscriber.

The UDM 137 stores, e.g., user's subscription data, policy data.

The UPFs 121 and 131 transfer the downlink PDU, received from the DN 133, to the UE 101 via the (R)AN 110 and transfer the PDU, received from the UE 101 via the (R)AN 110, to the DN 133.

The AF 141 may be an application server positioned outside the core network. The AF 141 interacts with 3GPP core network for providing services (e.g., supporting such functions as application influence on traffic routing, network capability exposure approach, and interactions with policy framework for policy control). According to another embodiment, the server (e.g., the edge configuration server or the edge enabler server) of the edge computing system may perform interworking with the 3GPP core network as the AF.

Figure 2:
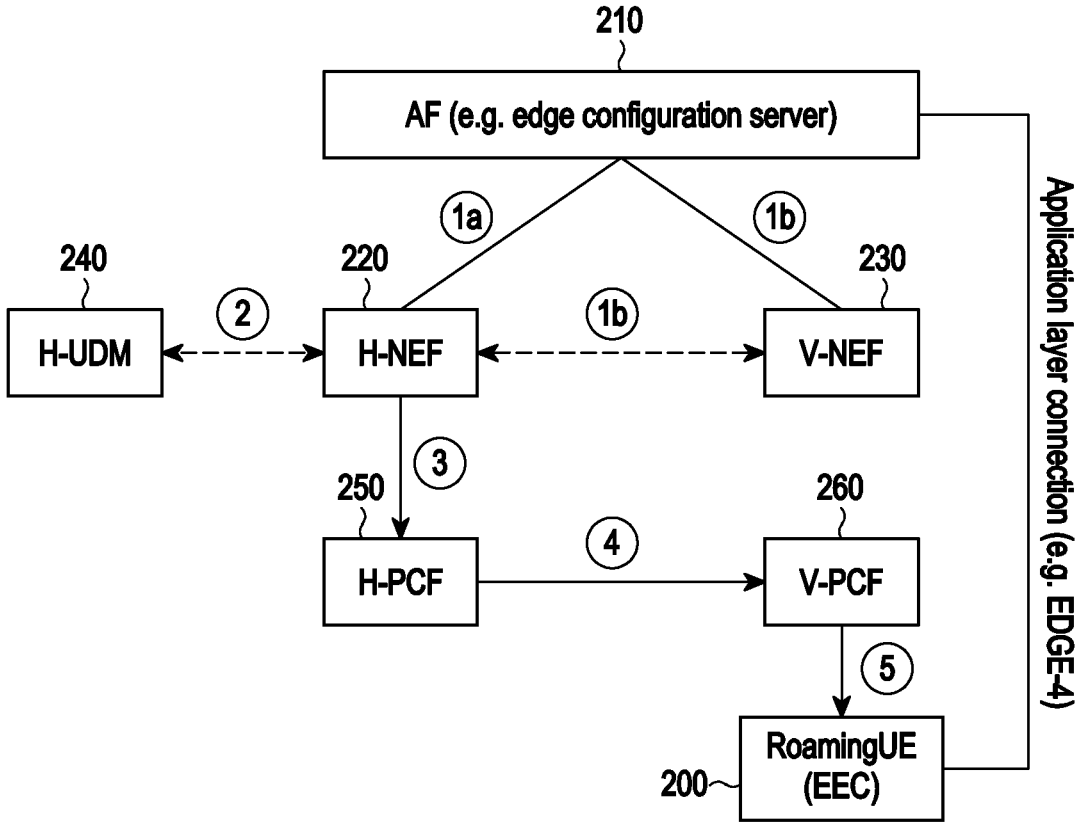
FIG. 2 illustrates a process of using the same application service as an HPLMN after a UE roams to a VPLMN according to an embodiment of the disclosure.

FIG. 2 illustrates a process of using a same application service as an HPLMN after a UE roams to a VPLMN according to an embodiment of the disclosure.

FIG. 2 illustrates an example in which a roaming UE 200 uses an edge computing service after roaming to the VPLMN. The roaming UE 200 supporting the edge computing service may support an edge enabler client (EEC) and may connect to an edge configuration server (ECS) 210 via the edge enabler client (EEC). The ECS 210 may provide configuration information necessary for the roaming UE 200 to use edge computing services. Referring to FIG. 2, the AF 141 may be implemented as the edge configuration server (ECS) 210 as an example of the application server positioned outside the core network.

The configuration information required to use the edge computing service may include at least one of data network name (DNN) or single-network slice selection assistance information (S-NSSAI) information about the edge data network and information about the edge enabler server (EES) in the edge data network. The configuration information required to use the edge computing service is information provided by the edge configuration server (ECS) to the edge enabler client (EEC), and the information is shared with the modem in the roaming UE 200 and is used to create a PDU session for accessing the edge computing service.

The roaming UE 200 including the edge enabler client (EEC) may transmit a service provisioning request to the ECS 210 used in the HPLMN through an EDGE-4 interface of the application layer after roaming to the VPLMN.

The ECS 210 may recognize that the roaming UE 200 requests to use the edge computing service even while roaming in the VPLMN. The ECS 210 may create an AF request to configure information necessary to create and transfer an edge computing service-related policy to the core network function of the VPLMN and the UE. According to another embodiment, the ECS 210 may directly transmit the AF request to a home network exposure function (H-NEF) 220 in operation 1a. According to another embodiment, the ECS 210 may transmit the AF request to the H-NEF 220 through a visited network exposure function (V-NEF) 230 in operation 1*b*.

The H-NEF 220 may send a request for authentication for the information necessary to create and transfer a policy required when the roaming UE 200 uses the edge computing service in the VPLMN to the home UDM (H-UDM) 240 in operation 2.

The H-NEF 220 may transfer the authenticated policy-related information to the H-PCF 250 in operation 3. The H-PCF 250 may create and transfer a related policy to the V-PCF 260 or request the V-PCF 260 to create and transfer a related policy to the roaming UE 200 in operation 4. The V-PCF 260 may transfer the related policy to the roaming UE 200 in operation 5.

The disclosure proposes a method for providing a network function for the roaming UE 200 to the service system (e.g., edge computing system) outside the core network. According to yet another embodiment, the disclosure proposes a method for deriving a request for an external application function (AF) for the roaming UE 200 to a proper NEF and a method for authenticating and processing a request for the roaming UE 200 in the NEF.

Figure 3:
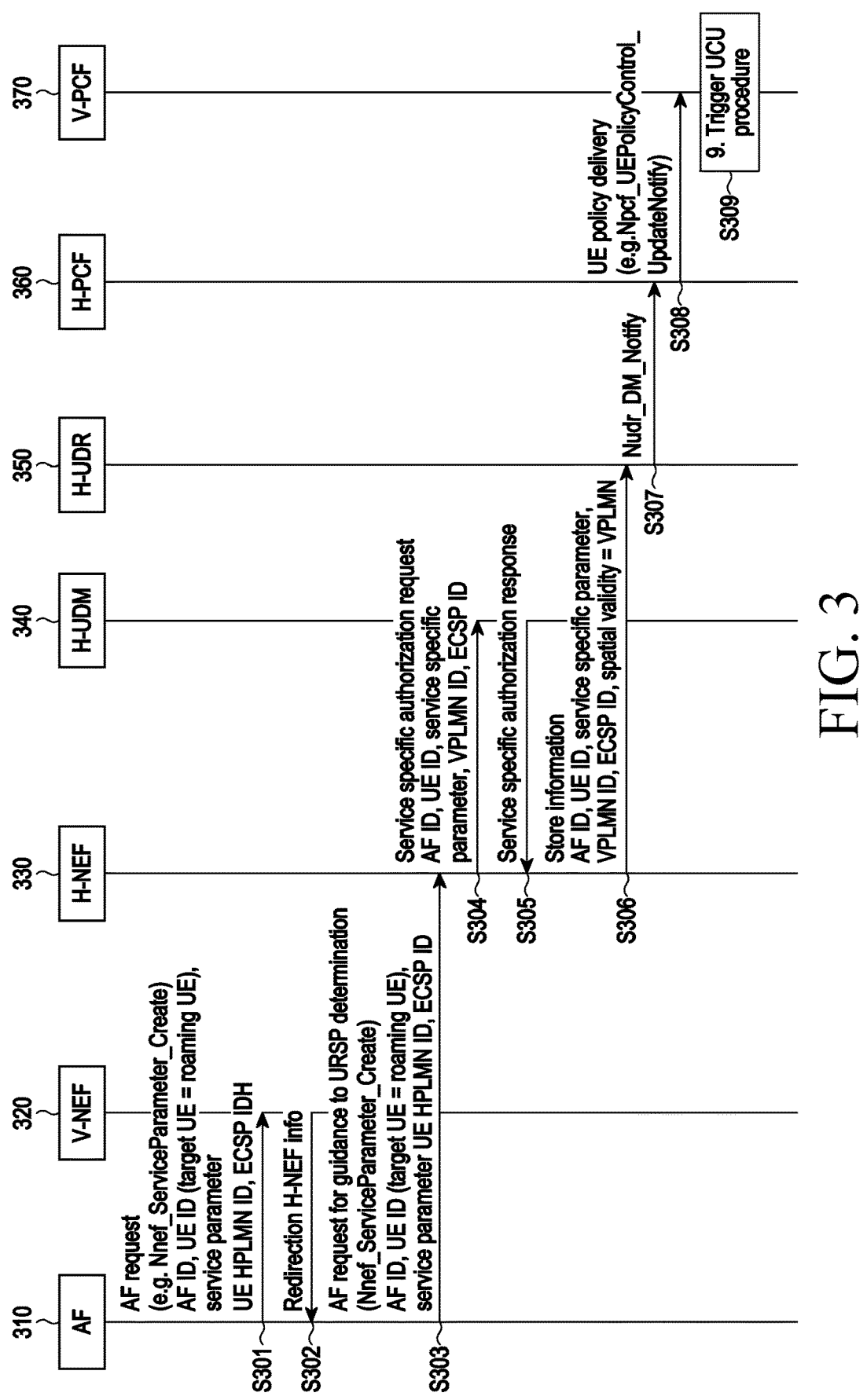
FIG. 3 is a view illustrating a method for processing an AF request according to an embodiment of the disclosure.

FIG. 3 is a view illustrating a method for processing an AF request according to an embodiment of the disclosure.

Referring to FIG. 3, a wireless communication system may include an AF 310, a V-NEF 320, an H-NEF 330, an H-UDM 340, a home user data repository (H-UDR) 350, an H-PCF 360, and a V-PCF 370. The V-NEF 320 and V-PCF 370 may belong to the VPLMN, and the H-NEF 330, H-UDM 340, H-UDR 350, and H-PCF 360 may belong to the HPLMN. According to another embodiment, the V-NEF 320 may provide H-NEF information to the AF 310 so that the AF 310 may directly interwork with the H-NEF 330 to process the AF request.

In operation S301, the AF 310 may transmit an AF request for a specific UE to the V-NEF 320. In the disclosure, for convenience of description, the external server that transmits the AF request to the V-NEF 320 is described as the AF 310, but the external server transmitting the AF request to the V-NEF 320 is not limited to the AF 310 but may rather be other various types of servers depending on design specifications.

According to yet another embodiment, when the AF request aims at service parameter provisioning, such as UE routing selection policy (URSP) determination guidance, the AF request may include at least one of the AF ID, target UE ID, service parameter information (including at least one of the DNN, S-NSSAI, or application traffic description), or service type (information indicating what the purpose of the AF request is or what the target service function is, e.g., information indicating that the AF request is one for AF guidance to URSP determination).

According to yet another embodiment, if the AF 310 may use the UE's HPLMN information (e.g., if able to receive the UE's HPLMN information from the client in the UE or obtain roaming status information), the AF request may include the UE's HPLMN information (e.g., HPLMN ID). According to still another embodiment, when the AF request is a policy-related request for supporting the edge computing service, edge computing service provider information (e.g., edge computing service provider ID or ECSP ID) may be included in the AF request and be transferred to the V-NEF 320

According to yet another embodiment, the AF request may include information indicating that spatial validity is limited to the VPLMN area. According to a further embodiment, the AF 310 may include the notification target address for the successful creation and transfer of the policy in the AF request. According to still another embodiment, the AF request may be implemented in the form of a request message for the NEF providing service, such as Nnef_ServiceParameter_Create.

In operation S302, when the V-NEF 320 determines that the target UE for the AF request received from the AF 310 is roaming, and the AF request received from the AF 310 needs to be processed in the network function of the HPLMN of the target UE, the V-NEF 320 may transmit H-NEF information (e.g., identifier and address information) and redirection indicator to the AF 310.

According to yet another embodiment, when authorization of the H-UDM 340 for the AF request is needed, the V-NEF 320 may determine that the received AF request needs to be processed in the network function of the HPLMN of the target UE. According to an embodiment, when the service type included in the AF request is AF guidance to URSP determination, the V-NEF 320 may determine that the received AF request needs to be processed in the network function of the HPLMN of the target UE.

According to yet another embodiment, the V-NEF 320 may transmit, to the AF 310, a failure cause indicating that the request for the UE should be performed through the H-NEF 330 so that the request of the AF 310 may be transferred to and processed in the network function (H-NEF, H-UDM, or H-PCF) of the HPLMN. According to still another embodiment, the H-NEF information that should be provided to the AF 310 by the V-NEF 320 may be set in the V-NEF 320 or be information obtained by the V-NEF 320 through the V-NRF (through the NF/NF service discovery across PLMNs service).

In operation S303, the AF 310 may transmit an AF request to the H-NEF 330 corresponding to the H-NEF information received from the V-NEF 320. The AF request may include at least one of the AF ID, target UE ID, service parameter information (including at least one of the DNN, S-NSSAI, or application traffic description), service type (e.g., information indicating that the AF request is one for AF guidance to URSP determination), information about spatial validity (limiting the area where the created policy is applied to the area in the VPLMN according to the AF request), the ID of the VPLMN where the UE is roaming (or serving PLMN ID), ECSP ID, or notification target address information about the successful creation and transfer of the policy. According to yet another embodiment, the AF 310 may obtain the serving PLMN ID from the client in the UE or request and obtain roaming status information including the UE's serving PLMN ID from the H-NEF 330.

In operation S304, when the AF request received from the AF 310 requires service-specific authorization (e.g., when the service type included in the AF request is AF guidance to URSP determination for guiding to URSP creation), the H-NEF 330 may transmit a request for service-specific authorization to the H-UDM 340 (e.g., UDM having subscriber information about the target UE for the AF request).

The service-specific authorization request message may include at least one of the AF ID, target UE ID, service parameter information (e.g., data network name, DNN, S-NSSAI, or application description), service type (e.g., information indicating that the AF request is one for AF guidance to URSP determination), or UE-roaming VPLMN ID (or serving PLMN ID), ECSP ID, or spatial validity (limiting the area where the created policy to the area in the VPLMN according to the AF request) information. According to a further embodiment, before performing the service-specific authorization, the H-NEF 330 may obtain the UE's roaming status information (e.g., the UE's current serving PLMN information) from the H-UDM 340, identifying whether the UE is in connection with the VPLMN ID (or serving PLMN ID) received through the AF request (whether the UE has successfully performed the procedure for registration with the VPLMN).

According to another embodiment, when the AF request does not include the VPLMN ID, the H-NEF 330 may obtain the UE's roaming status information (e.g., serving PLMN ID information) from the H-UDM 340, include the obtained serving PLMN ID information in the service-specific authorization request, and transmit it to the H-UDM 340.

In operation S305, the H-UDM 340 may perform authentication about whether the policy where the service parameter provided by the AF 310 in the VPLMN where the UE is currently roaming is applied may be created and transmit the authentication result to the H-NEF 330. According to yet another embodiment, the H-UDM 340 may determine whether to be able to create a policy to which the service parameter (e.g., DNN, S-NSSAI, or application traffic description) provided by the AF 310 is applied to the service supplied by a specific ECSP in the VPLMN considering at least one of the AF ID, UE ID, VPLMN ID, ECSP ID, and service parameter provided through the H-NEF 330.

In operation S306, if successfully performing the service specific authentication through the H-UDM 340 in the previous operation, the H-NEF 330 may transmit the information (e.g., the AF ID, target UE ID, service parameter information (at least one of the DNN, S-NSSAI, application traffic description, service type, VPLMN ID, ECSP ID, or spatial validity set in the VPLMN area)) included in the AF request to the H-UDR 350. After operation S306, the H-NEF 330 may transmit a response message including the result indicating that the AF request has successfully been performed to the AF 310.

In operation S307, the H-UDR 350 may transmit the policy-related information (at least one of the DNN, S-NS-SAI, application traffic description, service type, VPLMN ID, ECSP ID, or spatial validity set in the VPLMN area) included in the AF request obtained in the previous operation, to the H-PCF 360. According to yet another embodiment, such a service as Nudr_DM_Notify may be used for operation S307.

In operation S308, the H-PCF 360 may create a URSP based on the information received in the previous operation and request the V-PCF 370 to transmit the URSP. According to another embodiment, the H-PCF 360 may request the V-PCF 370 to create a URSP while transmitting at least one of the AF ID, target UE ID, service parameter information (at least one of the DNN, S-NSSAI, application traffic description, service type, VPLMN ID, ECSP ID, or spatial validity set in the VPLMN area)) or URSP create request indicator so that the V-PCF 370 may create/modify/transfer the related URSP.

In operation S309, the V-PCF 370 may perform a UE configuration update procedure to transfer the URSP, received from the H-PCF 360, to the UE. According to a further embodiment, the V-PCF 370 may create a URSP to be applied in the VPLMN considering at least one of the AF ID, target UE ID, service parameter information (at least one of the DNN, S-NSSAI, application traffic description, service type, VPLMN ID, ECSP ID, or spatial validity set in the VPLMN area)), or the URSP create request indicator received from the H-PCF 360 and transfer it to the UE.

According to an embodiment, after performing the above-described operations, the V-PCF 370 may notify the AF 310 that the URSP has successfully been transferred to the UE, through the H-PCF 360 and the H-NEF 330. According to still another embodiment, the V-PCF 370 may notify the AF 310 that the URSP has successfully been transferred to the UE, through the V-NEF 320, without passing through the H-PCF 360.

Figure 4:
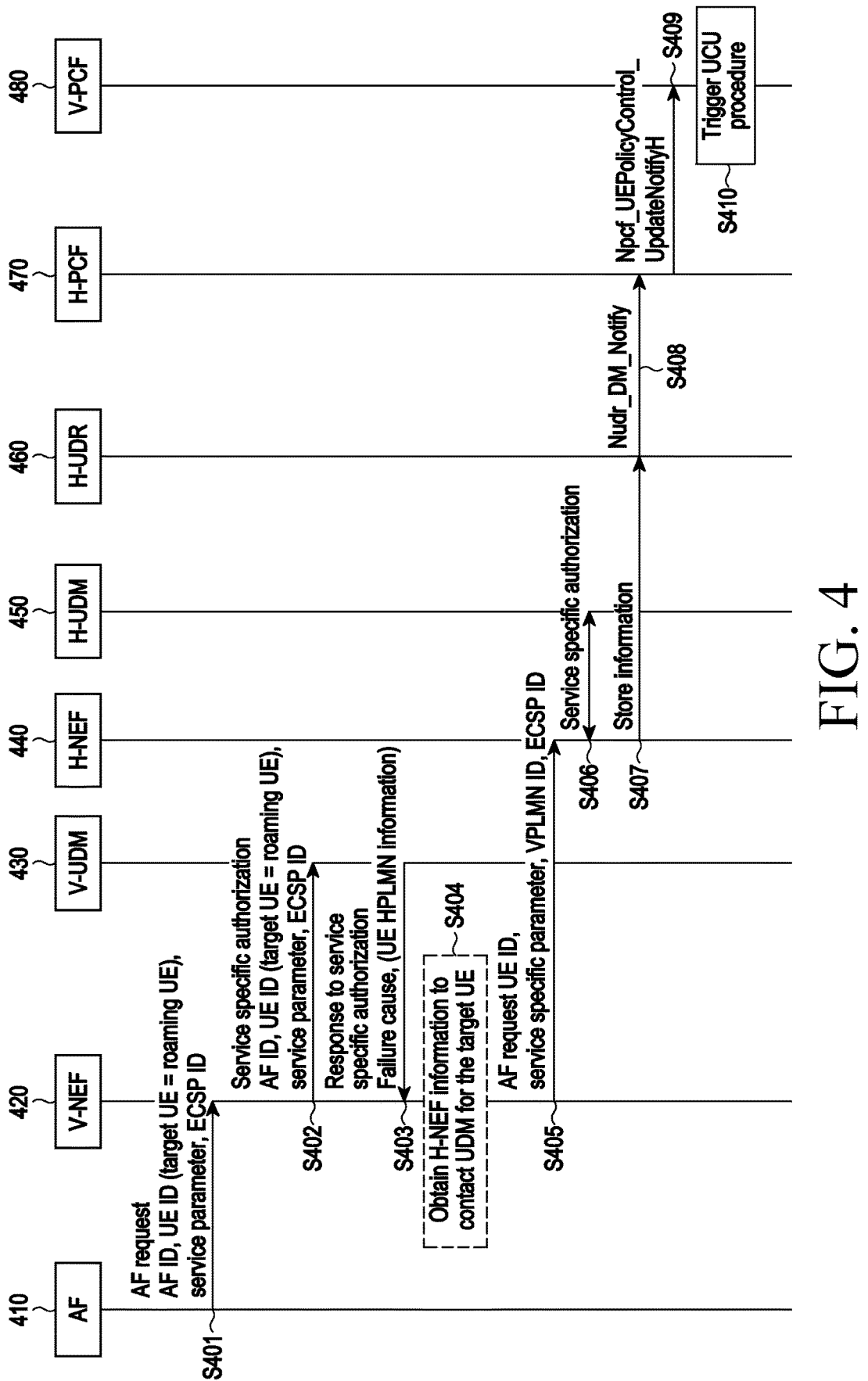
FIG. 4 is a view illustrating a method for processing an AF request according to an embodiment of the disclosure.

FIG. 4 is a view illustrating a method for processing an AF request according to an embodiment of the disclosure.

Referring to FIG. 4, a wireless communication system may include an AF 410, a V-NEF 420, a V-UDM 430, an H-NEF 440, an H-UDM 450, an H-UDR 460, an H-PCF 470, and a V-PCF 480. The V-NEF 420, V-UDM 430 and V-PCF 480 may belong to the VPLMN, and the H-NEF 440, H-UDM 450, H-UDR 460, and H-PCF 470 may belong to the HPLMN. According to another embodiment, the V-NEF 420 may serve as the AF 410 to process the AF request.

In operation S401, the AF 410 may transmit an AF request for a specific UE to the V-NEF 420.

In the disclosure, for convenience of description, the external server that transmits the AF request to the V-NEF 420 is described as the AF 410, but the external server transmitting the AF request to the V-NEF 420 is not limited to the AF 410 but may rather be other various types of servers depending on design specifications.

According to yet another embodiment, when the AF request aims at service parameter provisioning, such as UE routing selection policy (URSP) determination guidance, the AF request may include at least one of the AF ID, target UE ID, service parameter information (at least one of the DNN, S-NSSAI, or application traffic description), or service type (e.g., information indicating that the AF request is one for AF guidance to URSP determination).

According to a further embodiment, if the AF 410 is able to use the UE's HPLMN information, the UE's HPLMN information (e.g., HPLMN ID) may be included in the AF request. According to another embodiment, when the AF request is a policy-related request for supporting the edge computing service, the AF request may further include edge computing service provider information (e.g., edge computing service provider ID or ECSP ID). According to yet another embodiment, the AF request may further include information indicating that spatial validity is limited to the VPLMN area. According to a further embodiment, the AF request may further include the notification target address for the successful creation and transfer of the AF 410 policy.

In operation S402, the V-NEF 420 may transmit a service specific authorization request message including the information received from the AF 410 in operation S401 to the V-UDM 430.

In operation S403, the V-UDM 430 may transmit an indicator indicating authentication failure, failure cause (roaming UE) and HPLMN information (e.g., H-NEF information or H-NRF information) about the target UE to the V-NEF 420. According to yet another embodiment, since the target UE is the roaming UE, the V-UDM 430 does not possess related subscriber information and may not authenticate the roaming UE.

In operation S404, upon receiving a service specific authorization failure response from the V-UDM 430, the V-NEF 420 may specify or obtain information about the H-NEF to which the AF request is to be transmitted, using the HPLMN information (H-NEF information or H-NRF information) received from the V-UDM 430.

For example, if the V-UDM 430 provides H-NEF information, the V-NEF 420 uses the H-NEF information. As another example, if the V-UDM 430 provides the H-NRF information, the V-NEF 420 requests and obtains the H-NEF information from the H-NRF.

As another example, the V-NEF 420 requests and obtains the H-NEF information from the V-NRF and, in this case, the V-NEF 420 obtains the H-NEF information while providing the V-NRF with at least one of the VPLMN ID, the UE's HPLMN ID, expected service name (e.g., service parameter provisioning service), NF type (=NFF) and AF ID, or location information.

As another example, the V-NEF 420 informs the AF 410 of request processing failure and requests to provide the UE's HPLMN information. The AF 410 may request and obtain the UE's HPLMN information from the UE and use it to obtain the H-NEF information.

In operation S405, the V-NEF 420 may transmit, to the H-NEF 440, an AF request including at least one of the AF ID, target UE ID, service parameter information (at least one of the DNN, S-NSSAI, or application traffic description), service type (e.g., information indicating that the AF request is one for AF guidance to URSP determination), information about spatial validity (limiting the area where the created policy is applied to the area in the VPLMN according to the AF request), the ID of the VPLMN where the UE is roaming, ECSP ID, or notification target address information about the successful creation and transfer of the policy in operation S401. According to another embodiment, the V-NEF 420 may obtain the VPLMN ID of the VPLMN where the UE is roaming, through the AF 410 or may obtain the roaming status information including the UE's serving PLMN ID through the H-NEF 440 before performing operation 405 and include the VPLMN ID of the VPLMN where the UE is roaming, in the AF request.

In operation S406, if the H-NEF 440 needs service specific authorization with the H-UDM 450 based on the information received from the V-NEF 420 (e.g., when the service type in the AF request is AF guidance to URSP determination), the H-NEF 440 may request the H-UDM 450 to perform service specific authorization.

According to yet another embodiment, the H-NEF 440 may transmit the information received in operation S405, including the UE's VPLMN ID, to the H-UDM 450. According to still another embodiment, the H-UDM 450 may recognize that the service specific authorization request received from the H-NEF 440 should be applied to the VPLMN, perform authentication, and transmit the authentication result to the H-NEF 440.

In operation S407, after receiving a successful service specific authorization response from the H-UDM 450, the H-NEF 440 may store, in the H-UDR 460, at least one of the AF ID, target UE ID, service parameter information (at least one of the DNN, S-NSSAI, or application traffic description), service type (e.g., information indicating that the AF request is one for AF guidance to URSP determination), information about spatial validity (limiting the area where the created policy is applied to the area in the VPLMN according to the AF request), the ID of the VPLMN where the UE is roaming, ECSP ID, or notification target address information about the successful creation and transfer of the policy, included in the AF request, as received in operation S405.

After operation S407, the H-NEF 440 may notify the V-NEF 420 that the AF request has successfully been performed. Sequentially, the V-NEF 420 may transfer the successful AF request result received from the H-NEF 440 to the AF 410.

In operation S408, the H-UDR 460 may store the information received from the H-NEF 440 in operation S407 and transmit it to the H-PCF 470. In operation S408, the H-UDR 460 may transfer information through a service message, such as Nudr_DM_Notify.

In operation S409, the H-PCF 470 may create a URSP based on the information received in the above-described operation and request the V-PCF 480 to transmit the URSP. According to another embodiment, the H-PCF 470 may request the V-PCF 480 to create a URSP while providing at least one of the AF ID, target UE ID, service parameter information (at least one of the DNN, S-NSSAI, application traffic description, service type, VPLMN ID, ECSP ID, or spatial validity set in the VPLMN area)) or URSP create request indicator so that the V-PCF 480 may create/modify/transfer the related URSP.

In operation S410, the V-PCF 480 may perform a UE configuration update procedure to transfer the URSP, received from the H-PCF 470, to the UE. According to yet another embodiment, the V-PCF 480 may create a URSP to be applied in the VPLMN considering at least one of the AF ID, target UE ID, service parameter information (at least one of the DNN, S-NSSAI, application traffic description, service type, VPLMN ID, ECSP ID, or spatial validity set in the VPLMN area)), or the URSP create request indicator received from the H-PCF 470 and transfer it to the UE.

After the above-described operations, the V-PCF 480 may notify the AF 410 that the URSP has successfully been transferred to the UE, through the H-PCF 470 and the H-NEF 440. The V-PCF 480 may notify the AF 410 that the URSP has successfully been transferred to the UE, through the V-NEF 420, without passing through the H-PCF 470.

Figure 5:
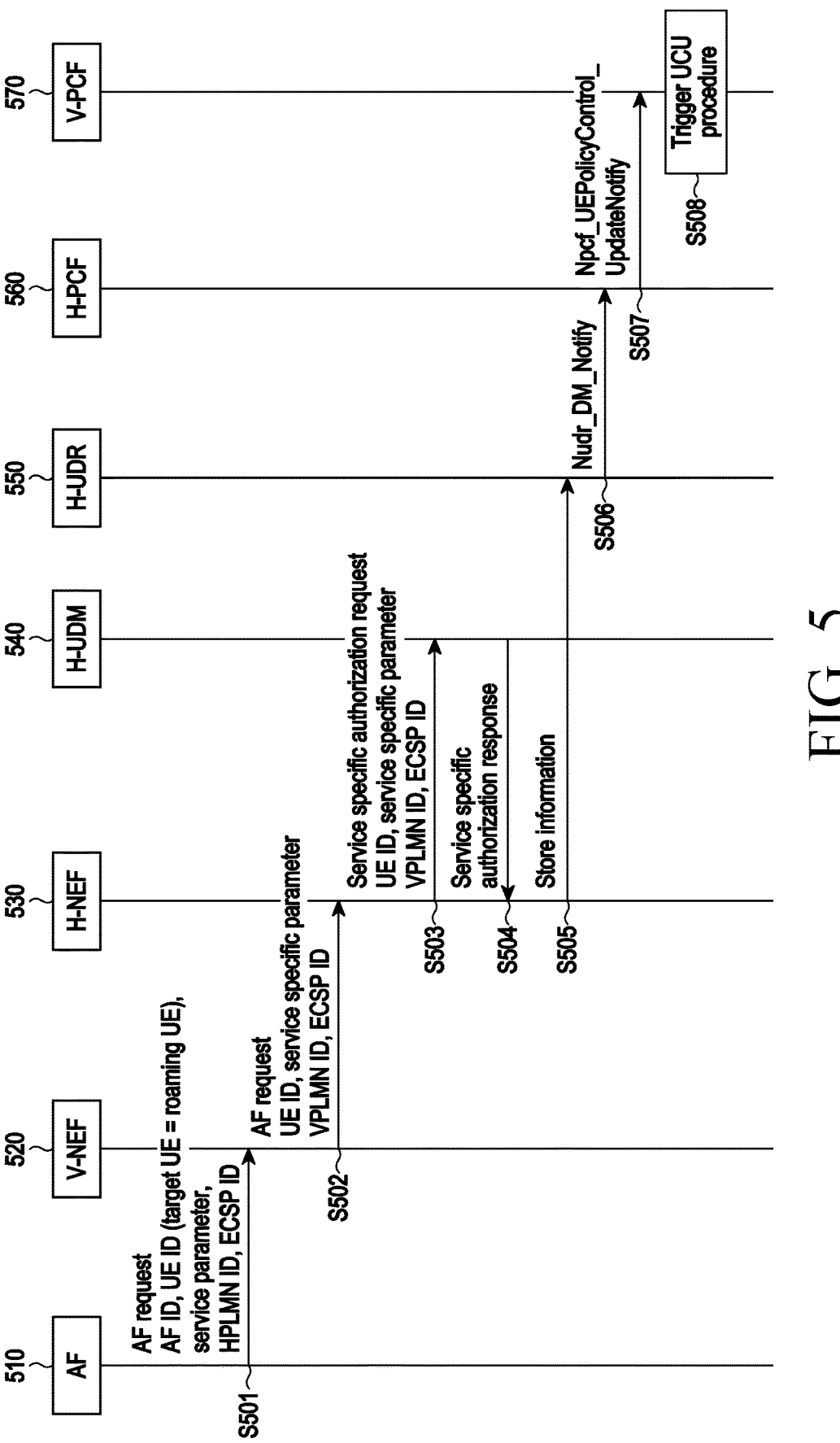
FIG. 5 is a view illustrating a method for processing an AF request according to an embodiment of the disclosure.

FIG. 5 is a view illustrating a method for processing an AF request according to an embodiment of the disclosure.

Referring to FIG. 5, a wireless communication system may include an AF 510, a V-NEF 520, an H-NEF 530, an H-UDM 540, an H-UDR 550, an H-PCF 560, and a V-PCF 570. The V-NEF 520 and V-PCF 570 may belong to the VPLMN, and the H-NEF 530, H-UDM 540, H-UDR 550, and H-PCF 560 may belong to the HPLMN. According to another embodiment, the V-NEF 520 may serve as the AF 510 to process the AF request.

In operation S501, the AF 510 may transmit an AF request for a specific UE to the V-NEF 520.

In the disclosure, for convenience of description, the external server that transmits the AF request to the V-NEF 520 is described as the AF 510, but the external server transmitting the AF request to the V-NEF 520 is not limited to the AF 510 but may rather be other various types of servers depending on design specifications.

According to another embodiment, when the AF request aims at service parameter provisioning, such as UE routing selection policy (URSP) determination guidance, the AF request may include at least one of the AF ID, target UE ID, service parameter information (at least one of the DNN, S-NSSAI, or application traffic description), or service type (e.g., information indicating that the AF request is one for AF guidance to URSP determination).

According to yet another embodiment, if the AF 510 is able to use the UE's HPLMN information, the UE's HPLMN information (e.g., HPLMN ID) may be included in the AF request. According to still another embodiment, when the AF request is a policy-related request for supporting the edge computing service, edge computing service provider information (e.g., edge computing service provider ID or ECSP ID) may be included in the AF request and be transmitted to the V-NEF 520 According to an embodiment, the AF request may further include information indicating that spatial validity is limited to the VPLMN area. According to a further embodiment, the AF 510 may further include the notification target address for the successful creation and transfer of the policy in the AF request.

In operation S502, the V-NEF 520 transmits, to the H-NEF 530, an AF request including the information received from the AF 510 in operation S501 as described above, i.e., [at least one of the AF ID, target UE ID, service parameter information (at least one of the DNN, S-NSSAI, or application traffic description), service type (e.g., information indicating that the AF request is one for AF guidance to URSP determination), spatial validity (limiting the area where the created policy is applied to the area in the VPLMN according to the AF request) information, the VPLMN ID of the VPLMN where the UE is roaming, the ECSP ID, or notification target address of the successful creation and transfer of the policy].

The H-NEF information to transmit the AF request may be configured in the V-NEF 520 or be obtained through the V-NRF (through the NF/NF service discovery across PLMNs service).

For example, when the received AF request should be processed through the network function of the HPLMN, the V-NEF 520 provides at least one of the VPLMN ID, HPLMN ID, expected service name, or network type to the V-NRF and obtain H-NEF information (e.g., identifier and address information) matching the same, from the V-NRF.

According to another embodiment, the V-NEF 520 may obtain the UE's roaming status information including the serving PLMN ID through the H-NEF 530 and include the obtained serving PLMN ID, as the VPLMN ID of the VPLMN where the UE is roaming in the request message of operation 502.

In operation S503, upon determining that service specific authorization with the H-UDM 540 is needed based on the information received from the V-NEF 520 (e.g., when the service type in the AF request is AF guidance to URSP determination), the H-NEF 530 may request service a specific authorization from the H-UDM 540. According to yet another embodiment, the H-UDM 540 may provide the information received in operation S502, including the UE's VPLMN ID, to the H-UDM 540. According to still another embodiment, the H-NEF 530 may identify whether the VPLMN ID of the VPLMN where the UE is roaming, as provided from the V-NEF 520, matches the actual roaming status of the UE, through the H-UDM 540.

In operation S504, the H-UDM 540 may recognize that the service specific authorization request received from the H-NEF 530 should be applied to the VPLMN, perform authentication, and transmit the authentication result to the H-NEF 530. For example, the H-UDM 540 includes a procedure for identifying whether the VPLMN ID included in the received service specific authorization request is identical to the serving PLMN information included in the UE's roaming status information, in the authentication procedure.

In operation S505, after receiving a successful service specific authorization response from the H-UDM 540, the H-NEF 530 may store, in the H-UDR 550, at least one of the AF ID, target UE ID, service parameter information (at least one of the DNN, S-NSSAI, or application traffic description), service type (e.g., information indicating that the AF request is one for AF guidance to URSP determination), information about spatial validity (limiting the area where the created policy is applied to the area in the VPLMN according to the AF request), the ID of the VPLMN where the UE is roaming, ECSP ID, or notification target address information about the successful creation and transfer of the policy, included in the AF request, as received in operation S502.

After operation S505, the H-NEF 530 may notify the V-NEF 520 that the AF request has successfully been performed. According to another embodiment, the V-NEF 520 may transmit the successful AF request result received from the H-NEF 530 to the AF 510.

In operation S506, the H-UDR 550 may store the information received from the H-NEF 530 in operation S505 and provide it to the H-PCF 560. In operation S506, the H-UDR 550 may transfer information using a service message, such as Nudr_DM_Notify.

In operation S507, the H-PCF 560 may create a URSP based on the information received in the above-described operation and request the V-PCF 570 to transmit the URSP. According to a further embodiment, the H-PCF 560 may request the V-PCF 570 to create a URSP while providing at least one of the AF ID, target UE ID, service parameter information (at least one of the DNN, S-NSSAI, application traffic description, service type, VPLMN ID, ECSP ID, or spatial validity set in the VPLMN area)) or URSP create request indicator so that the V-PCF 480 may create/modify/transfer the related URSP.

In operation S508, the V-PCF 570 may perform a UE configuration update procedure to transfer the URSP, received from the H-PCF 560, to the UE. According to an embodiment, the V-PCF 570 may create a URSP to be applied in the VPLMN considering at least one of the AF ID, target UE ID, service parameter information, at least one of the DNN, S-NSSAI, application traffic description, service type, VPLMN ID, ECSP ID, or spatial validity set in the VPLMN area, or the URSP create request indicator received from the H-PCF 560 and transfer it to the UE.

According to another embodiment, the V-PCF 570 may notify the AF 510 that the URSP has successfully been transferred to the UE, through the H-PCF 560 and the H-NEF 530. According to yet another embodiment, the V-PCF 570 may notify the AF 510 that the URSP has successfully been transferred to the UE, through the V-NEF 520, without passing through the H-PCF 560.

As described in connection with FIGS. 3, 4, and 5, when the V-NEF receives an AF request, the V-NEF itself does not serve as an AF but may transfer H-NEF information to the AF (FIG. 3) or itself may serve as an AF to transmit an AF request to the H-NEF (FIGS. 4 and 5). Such V-NEF operation may be determined based on the operator's policy configured in the V-NEF or according to whether the V-NEF supports capability of performing a role as an AF (whether to support AF request creation and transmission function).

When the V-NEF is capable of creating an AF request, the AF request may be processed according to FIGS. 3 and 4. If the V-NEF is unable to create the AF request, the H-NEF may be provided to the AF so that the AF directly may interwork with the H-NEF.

Further, when the V-NEF is unable to determine that the received AF request target UE is the roaming UE, the V-NEF may perform interworking with the V-UDM as shown in FIG. 4. If the V-NEF may know that the AF request target UE is the roaming UE, the V-NEF may perform an operation (FIG. 5) for directly interworking with the H-NEF.

Figure 6:
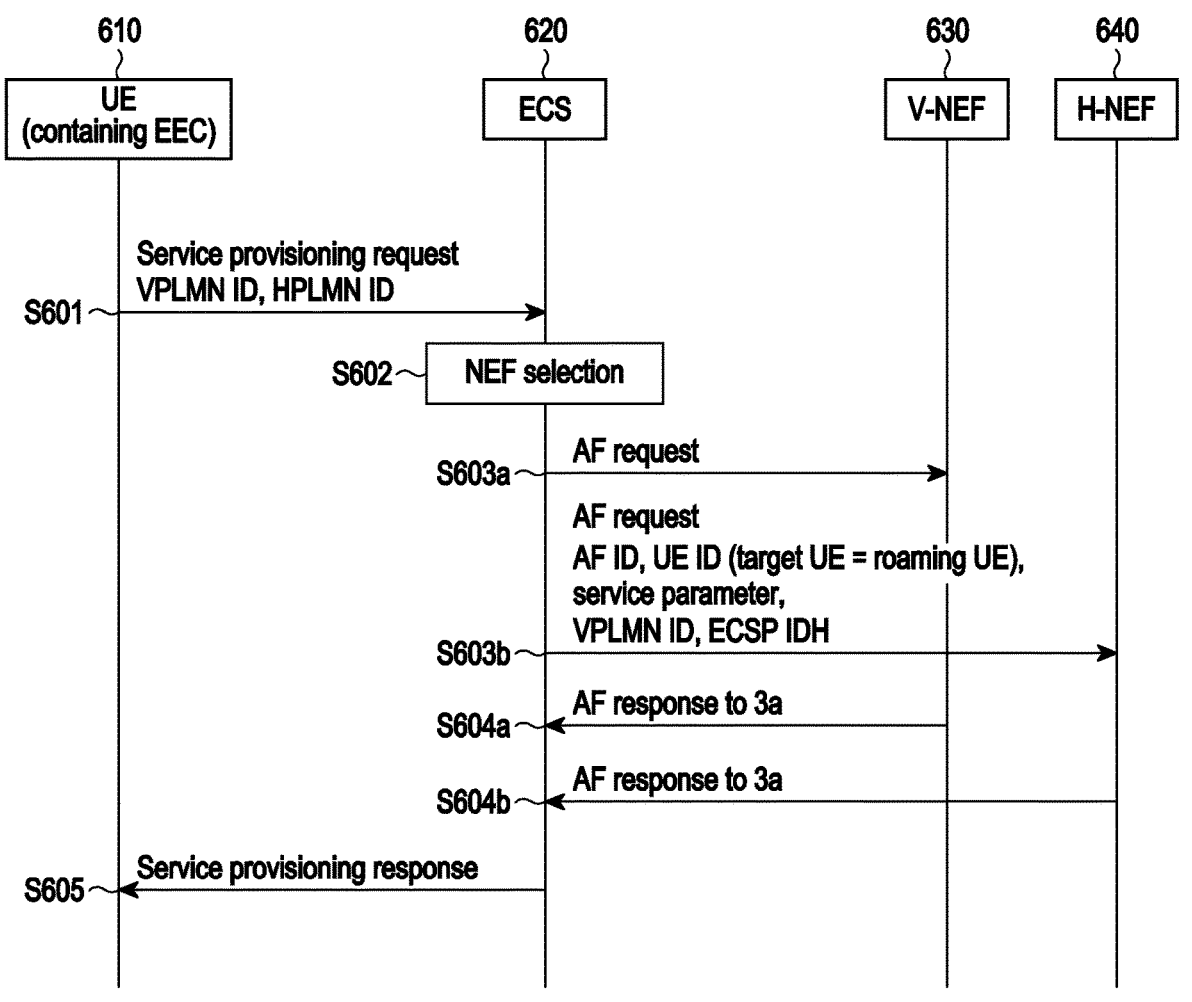
FIG. 6 is a view illustrating a method for selecting an NEF performing an AF request according to an embodiment of the disclosure.

FIG. 6 is a view illustrating a method for selecting an NEF performing an AF request according to an embodiment of the disclosure.

Referring to FIG. 6, a wireless communication system may include a UE 610, an edge configuration server (ECS) 620, a V-NEF 630, and an H-NEF 640. According to another embodiment, the ECS 620 may serve as an AF and support the function of storing or obtaining information about the V-NEF 630 or H-NEF 640. According to yet another embodiment, the UE 610 may include an edge enabler client (EEC) communicating with the ECS 620. According to a further embodiment, the V-NEF 630 may belong to the VPLMN, and the H-NEF 640 may belong to the HPLMN.

In operation S601, the UE 610 supporting the EEC may access the VPLMN and transmit a service provisioning request to the ECS 620. According to still another embodiment, the service provisioning request message may include at least one of the VPLMN ID, HPLMN ID, or UE identifier.

In operation S602, the ECS 620 may determine to send an AF request for the purpose of configuring the policy in the UE or monitoring the location. According to another embodiment, the ECS 620 may perform NEF selection as follows, depending on the VPLMN ID, HPLMN ID, and/or AF request type provided by the UE.

When V-NEF is selected
If the target UE is not the roaming UE
Performs AF request to monitor location information about UE in VPLMN
Performs AF request for AF traffic influence, such as traffic route setting or QoS setting of UE in VPLMN
Performs AF request for user plan path management event monitoring of UE in VPLMN
When AF request is one for service parameter provisioning requiring the service specific authorization procedure of H-UDM, but ECS is unaware of information about H-NEF
When H-NEF is selected
When target UE is roaming UE, and AF request is one for service parameter provisioning, and service specific authorization procedure of H-UDM is required (e.g., when AF request is one for AF guidance to URSP determination)

According to yet another embodiment, when the ECS 620 is unaware whether the target UE is the roaming UE (e.g., when the UE does not provide the VPLMN ID or HPLMN ID), the ECS 620 may identify the roaming status information about the UE through the NEF (i.e., V-NEF 630) of the UE's serving PLMN and select the NEF to which the AF request is to be transmitted according to the above-described operation.

In operation S603a, the ECS 620 may transmit the AF request to the NEF (e.g., V-NEF 630) selected in operation S602.

In operation S603b, when the AF request is for service parameter provisioning, and service specific authorization of the UDM is required, the ECS 620 may transmit, to the NEF (e.g., the H-NEF 640) selected in operation S602, at least one of the VPLMN ID, AF ID, UE ID, service parameter (DNN, S-NSSAI, or application traffic description), or ECS provider identifier (e.g., ECSP ID). According to a further embodiment, when the AF request is transmitted to the H-NEF 640, the VPLMN ID should be included in the AF request message.

In operation S604a, the ECS 620 may receive a response to the AF request transmitted in operation S603a, from the V-NEF 630. In operation S604b, the ECS 620 may receive a response to the AF request transmitted in operation S603b, from the H-NEF 640.

According to yet another embodiment when the AF request transmitted in operation S603 is AF guidance to URSP determination, the ECS 620 may receive a response to the AF request and, after waiting until a notification that the URSP has successfully been transferred to the UE is received, perform next operation S605. In other cases, after identifying a response to the AF request of operation S603a or operation S603b, the ECS 620 may immediately perform the next operation.

In operation S605, after identifying that the AF request has successfully been configured in the core network, the ECS 620 may transmit a service provisioning response including edge data network configuration information to the UE 610.

Figure 7:
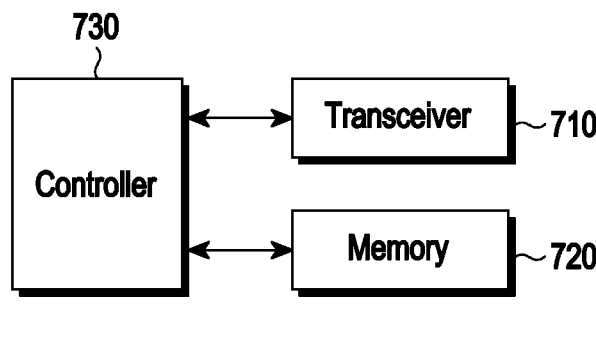
FIG. 7 illustrates a structure of a network device according to an embodiment of the disclosure.

FIG. 7 illustrates a structure of a network device according to an embodiment of the disclosure.

Each of the network entities (e.g., AF, NEF, UDM, UDR, and PCF) belonging to the HPLMN or VPLMN described in connection with FIGS. 1 to 6 may correspond to the network device of FIG. 7. Referring to FIG. 7, the network device may include a transceiver 710, a memory 720, and a controller (e.g., at least one processor) 730.

The transceiver 710, controller 730, and memory 720 of the network device may be operated according to the above-described network device communication method. However, the components of the network device are not limited thereto. For example, the network device includes more or fewer components than the above-described components. The transceiver 710, the controller 730, and the memory 720 may be implemented in the form of a single chip. The controller 730 may include one or more processors.

The transceiver 710 collectively refers to a transmitter of the network device and a receiver of the network device and may transmit and receive signals to/from another device. To that end, the transceiver 710 may include a radio frequency (RF) transmitter for frequency-up converting and amplifying signals transmitted and an RF receiver for low-noise amplifying signals received and frequency-down converting the frequency of the received signals. However, this is merely an example of the transceiver 710, and the components of the transceiver 710 are not limited to the RF transmitter and the RF receiver.

The transceiver 710 may receive signals via a radio channel, output the signals to the controller 730, and transmit signals output from the controller 730 via a radio channel.

The memory 720 may store programs and data necessary for the operation of the network device. Further, the memory 720 may store control information or data that is included in the signal obtained by the network device. The memory 720 may include a storage medium, such as read-only memory (ROM), random-access memory (RAM), hard disk, compact disc read-only memory (CD-ROM), and digital versatile disc (DVD), or a combination of storage media. Rather than being separately provided, the memory 720 may be embedded in the controller 730.

The controller 730 may control a series of processes for the network device to be able to operate according to the above-described embodiments.

According to another embodiment, the V-NEF device belonging to the VPLMN may include a transceiver 710 and a controller 730. According to yet another embodiment, the controller 730 of the V-NEF device may control a first message including identification information about the roaming UE, application function identifier (AF ID), and edge computing service provider identifier (ECSP ID). According to a further embodiment, the controller 730 of the V-NEF device may identify the home network exposure function (H-NEF) belonging to the home public land mobile network (HPLMN) of the roaming UE. According to still another embodiment, the controller 730 of the V-NEF device may control to transmit a second message including the VPLMN ID and the ECSP ID to the H-NEF belonging to the HPLMN.

According to another embodiment, the controller 730 of the V-NEF device may control to transmit a third message including the ECSP ID to the visited unified data management (V-UDM) belonging to the VPLMN. According to yet another embodiment, the controller 730 of the V-NEF device may control to receive a fourth message including HPLMN information about the roaming UE and information about authentication failure cause from the V-UDM.

According to a further embodiment, the controller 730 of the V-NEF device may obtain information about the H-NEF based on the HPLMN information about the roaming UE to access the home unified data management (H-UDM) belonging to the roaming UE's HPLMN.

According to another embodiment, the controller 730 of the V-NEF device may control to receive the application function request (AF request) message from the edge configuration server and control to transmit an AF response message to the edge configuration server in response to the AF request message.

According to yet another embodiment, if the V-NEF receives the first message from the application function (AF), the controller 730 of the V-NEF device may control to receive information about the H-NEF from the AF.

According to another embodiment, the H-NEF device belonging to the HPLMN may include a transceiver 710 and a controller 730. According to still another embodiment, the controller 730 of the H-NEF device may control to receive a first message including the VPLMN ID and edge computing service provider identifier (ECSP ID) from the visited network exposure function (V-NEF) belonging to the visited public land mobile network (VPLMN) of the roaming UE. According to a further embodiment, the controller 730 of the H-NEF device may control to transmit a second message including the VPLMN ID and the ECSP ID to the home unified data management (H-UDM) belonging to the HPLMN. According to yet another embodiment, the controller 730 of the H-NEF device may control to receive a response message to the second message from the H-UDM.

According to an embodiment, the controller 730 of the H-NEF device may control to receive an application function request (AF request) message from the edge configuration server. According to another embodiment, the controller 730 of the H-NEF device may control to transmit an AF response message to the edge configuration server in response to the AF request message.

According to yet another embodiment, the controller 730 of the H-NEF device may control to receive a third message including identification information about the roaming UE, application function identifier (AF ID), and ECSP ID from the application function (AF).

Figure 8:
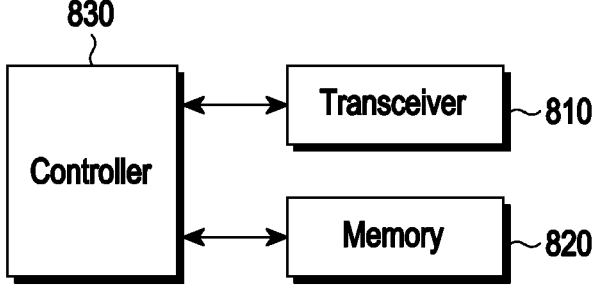
FIG. 8 illustrates a structure of a UE according to an embodiment of the disclosure.

FIG. 8 illustrates a structure of a UE according to an embodiment of the disclosure.

The UE (or terminal) described above in connection with FIGS. 1 to 6 may correspond to the UE of FIG. 8. Referring to FIG. 8, the UE may include a transceiver 810, a memory 820, and a controller (e.g., at least one processor) 830.

The transceiver 810, controller 830, and memory 820 of the UE may operate according to the above-described communication methods by the UE. However, the components of the UE are not limited thereto. For example, the UE includes more or fewer components than the above-described components. The transceiver 810, the controller 830, and the memory 820 may be implemented in the form of a single chip. The controller 830 may include one or more processors.

The transceiver 810 collectively refers to a transmitter of the UE and a receiver of the UE and may transmit and receive signals to/from another device. To that end, the transceiver 810 may include a radio frequency (RF) transmitter for frequency-up converting and amplifying signals transmitted and an RF receiver for low-noise amplifying signals received and frequency-down converting the frequency of the received signals. However, this is merely an example of the transceiver 810, and the components of the transceiver 810 are not limited to the RF transmitter and the RF receiver.

The transceiver 810 may receive signals via a radio channel, output the signals to the controller 830, and transmit signals output from the controller 830 via a radio channel.

The memory 820 may store programs and data necessary for the operation of the UE. The memory 820 may store control information or data that is included in the signal obtained by the UE. The memory 820 may include a storage medium, such as ROM, RAM, hard disk, CD-ROM, and DVD, or a combination of storage media. Rather than being separately provided, the memory 820 may be embedded in the controller 830.

The controller 830 may control a series of processes for the UE to be able to operate according to the above-described embodiments.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a visited network exposure function (V-NEF) belonging to a visited public land mobile network (VPLMN) of a roaming user equipment (UE) in a wireless communication system, the method comprising:

receiving a first message including identification information about the roaming UE, an application function identifier (AF ID), and an edge computing service provider identifier (ECSP ID);

identifying a home network exposure function (H-NEF) belonging to a home public land mobile network (HPLMN) of the roaming UE; and transmitting, to the H-NEF belonging to the HPLMN, a second message including a VPLMN ID and the ECSP ID.

2. The method of claim 1, further comprising:

transmitting, to a visited unified data management (V-UDM) belonging to the VPLMN, a third message including the ECSP ID; and receiving, from the V-UDM, a fourth message including HPLMN information about the roaming UE and information about an authentication failure cause.

3. The method of claim 2, further comprising:

obtaining information about the H-NEF based on the HPLMN information about the roaming UE to access a home unified data management (H-UDM) belonging to the HPLMN of the roaming UE.

4. The method of claim 1, wherein the first message further includes an HPLMN ID and a service parameter.

5. The method of claim 2, further comprising:

receiving, from the V-UDM, an application function (AF) request message; and transmitting, to an edge configuration server, an AF response message in response to the AF request message.

6. The method of claim 1, further comprising:

in case that the V-NEF receives the first message from an application function (AF), receiving, from the AF, information about the H-NEF.

7. A visited network exposure function (V-NEF) device belonging to a visited public land mobile network (VPLMN) of a roaming user equipment (UE) in a wireless communication system, the V-NEF device comprising:

a transceiver; and a controller coupled with the transceiver and configured to control to:

receive a first message including identification information about the roaming UE, an application function identifier (AF ID), and an edge computing service provider identifier (ECSP ID), identify a home network exposure function (H-NEF) belonging to a home public land mobile network (HPLMN) of the roaming UE, and transmit, to the H-NEF belonging to the HPLMN, a second message including a VPLMN ID and the ECSP ID.

8. The V-NEF device of claim 7, wherein the controller is further configured to:

transmit, to a visited unified data management (V-UDM) belonging to the VPLMN, a third message including the ECSP ID, and receive, from the V-UDM, a fourth message including HPLMN information about the roaming UE and information about an authentication failure cause.

9. The V-NEF device of claim 8, wherein the controller is further configured to:

obtain information about the H-NEF based on the HPLMN information about the roaming UE to access a home unified data management (H-UDM) belonging to the HPLMN of the roaming UE.

10. The V-NEF device of claim 7, wherein the first message further includes an HPLMN ID and a service parameter.

11. The V-NEF device of claim 7, wherein the controller is further configured to:

receive, from an edge configuration server, an application function (AF) request message, and transmit, to the edge configuration server, an AF response message in response to the AF request message.

12. The V-NEF device of claim 7, wherein the controller is further configured to:

in case that the V-NEF receives the first message from an application function (AF), receive, from the AF, information about the H-NEF.

* * * * *